(12) United States Patent
Ebrahimi Afrouzi et al.

(10) Patent No.: US 10,933,534 B1
(45) Date of Patent: Mar. 2, 2021

(54) EDGE DETECTION SYSTEM

(71) Applicants: Ali Ebrahimi Afrouzi, San Jose, CA (US); Soroush Mehrnia, Soeborg (DK); Masih Ebrahimi Afrouzi, Berkely, NV (US)

(72) Inventors: Ali Ebrahimi Afrouzi, San Jose, CA (US); Soroush Mehrnia, Soeborg (DK); Masih Ebrahimi Afrouzi, Berkely, NV (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/279,699

(22) Filed: Feb. 19, 2019

Related U.S. Application Data

(63) Continuation-in-part of application No. 14/941,385, filed on Nov. 13, 2015, now Pat. No. 10,254,403.

(51) Int. Cl.
| | |
|---|---|
| *B25J 9/00* | (2006.01) |
| *B25J 9/16* | (2006.01) |
| *B25J 5/00* | (2006.01) |
| *B25J 11/00* | (2006.01) |
| *A47L 9/28* | (2006.01) |
| *A47L 9/04* | (2006.01) |
| *A47L 9/00* | (2006.01) |
| *G01S 15/931* | (2020.01) |
| *G01S 17/931* | (2020.01) |

(52) U.S. Cl.
CPC ............. *B25J 9/1697* (2013.01); *A47L 9/009* (2013.01); *A47L 9/04* (2013.01); *A47L 9/2826* (2013.01); *A47L 9/2852* (2013.01); *B25J 5/007* (2013.01); *B25J 9/1666* (2013.01); *B25J 11/0085* (2013.01); *A47L 2201/04* (2013.01); *G01S 15/931* (2013.01); *G01S 17/931* (2020.01)

(58) Field of Classification Search
CPC ........ B25J 9/1697; B25J 5/007; B25J 9/1666; B25J 11/0085; A47L 9/009; A47L 9/04; A47L 9/2826; A47L 9/2852; A47L 2201/04; G01S 17/931; G01S 15/931
USPC .......................................................... 73/627
See application file for complete search history.

(56) References Cited

U.S. PATENT DOCUMENTS

| | | | |
|---|---|---|---|
| 5,440,216 | A | 8/1995 | Kim |
| 5,497,529 | A | 3/1996 | Boesi |
| 5,940,927 | A | 8/1999 | Haegermarck |
| 6,400,311 | B1 | 6/2002 | Kolbli |
| 6,988,331 | B2 | 1/2006 | Holmberg |
| 7,057,501 | B1 | 6/2006 | Davis |
| 7,801,645 | B2 | 9/2010 | Taylor |

(Continued)

*Primary Examiner* — Max H Noori

(57) ABSTRACT

Included is a method for a mobile automated device to detect and avoid edges including: providing one or more rangefinder sensors on the mobile automated device to calculate, continuously or periodically, distances from the one or more rangefinder sensor to a surface; monitoring, with a processor of the mobile automated device, the distances calculated by each of the one or more rangefinder sensors; and actuating, with the processor of the mobile automated device, the mobile automated device to execute one or more predetermined movement patterns upon the processor detecting a calculated distance greater than a predetermined amount, wherein the one or more movement patterns initiate movement of the mobile automated device away from the area where the increase was detected.

20 Claims, 7 Drawing Sheets

(56) References Cited

U.S. PATENT DOCUMENTS

| | | | |
|---|---|---|---|
| 8,087,117 B2 | 1/2012 | Kapoor | |
| 8,516,651 B2 | 8/2013 | Jones | |
| 10,254,403 B1* | 4/2019 | Ebrahimi Afrouzi | G01S 15/88 |
| 2004/0130685 A1 | 7/2004 | Wu | |
| 2004/0204792 A1 | 10/2004 | Taylor | |
| 2011/0123135 A1* | 5/2011 | Hsieh | G06K 9/00201 |
| | | | 382/285 |
| 2013/0145572 A1 | 6/2013 | Schregardus | |
| 2014/0009748 A1* | 1/2014 | Leonessa | G01C 3/08 |
| | | | 356/4.03 |
| 2014/0223678 A1* | 8/2014 | Chiu | A47L 11/4038 |
| | | | 15/98 |

\* cited by examiner

EDGE DETECTION SYSTEM

CROSS-REFERENCE TO RELATED APPLICATIONS

This application is continuation-in-part of U.S. patent application Ser. No. 14/941,385, filed Nov. 13, 2015, which is Non-Provisional Patent Application of U.S. Provisional Patent Application No. 62/083,464, filed Nov. 24, 2014, each of which are hereby incorporated by reference.

In this patent, certain U.S. patents, U.S. patent applications, or other materials (e.g. articles) have been incorporated by reference. Specifically, U.S. application Ser. Nos. 15/243,783, 15/954,335, 15/954,410, 15/257,798, 15/674,310, 15/224,442, and 15/683,255 are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present invention relates to mobile automated devices, such as robotic floor cleaners. More particularly, the invention relates to methods for mobile automated devices to detect edges or drop-offs.

BACKGROUND

Mobile automated devices are becoming increasingly common in consumer homes. These may include robotic vacuums, robotic mops, robotic lawn mowers, robotic gutter cleaners, robotic devices for transporting items, and other devices that move through environments autonomously to perform tasks in residential and commercial settings. One problem that such devices face is effectively identifying dangerous drop-offs. Mobile automated devices are often unable to traverse stairs or ledges without incurring damage; thus, these and similar structures must be avoided. A need exists for a precise method to identify dangerous drop-offs and edges. Additionally, a need exists for a method to differentiate between large edges that are dangerous and smaller elevation changes that are traversable.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Included is a method for a mobile automated device to detect and avoid edges including: providing one or more rangefinder sensors on the mobile automated device to calculate, continuously or periodically, distances from the one or more rangefinder sensor to a surface; monitoring, with a processor of the mobile automated device, the distances calculated by each of the one or more rangefinder sensors; and actuating, with the processor of the mobile automated device, the mobile automated device to execute one or more predetermined movement patterns upon the processor detecting a calculated distance greater than a predetermined amount, wherein the one or more movement patterns initiate movement of the mobile automated device away from the area where the increase was detected.

Provided is a system for identifying edges for a mobile automated device including: one or more rangefinder sensors coupled to the mobile automated device capable of calculating, continuously or periodically, distances to a surface; and a processor electrically coupled with the one or more rangefinder sensors capable of monitoring the distances calculated by each of the one or more rangefinder sensors and capable of actuating the mobile automated device to execute one or more predetermined movement patterns upon detecting a calculated distance greater than a predetermined amount, wherein the one or more movement patterns initiate movement of the mobile automated device away from the area where the increase was detected.

Provided is a robotic device including: a chassis; a drive system installed in the chassis capable of enabling movement of the robotic device, the drive system comprising a set of wheels; a control system in communication with the drive system including a processor capable of controlling the drive system to execute at least one movement pattern of the robotic device; a battery to provide power to the system; and one or more distance sensors positioned on the chassis and electrically coupled with the processor to calculate distances from the one or more distance sensors to a surface, wherein the distances calculated by each of the one or more rangefinder sensors are monitored by the processor, and wherein a detected distance greater than a predetermined amount causes the control system to initiate execution of one or more predetermined movement patterns.

DETAILED DESCRIPTION OF SOME EMBODIMENTS

Figure 1:
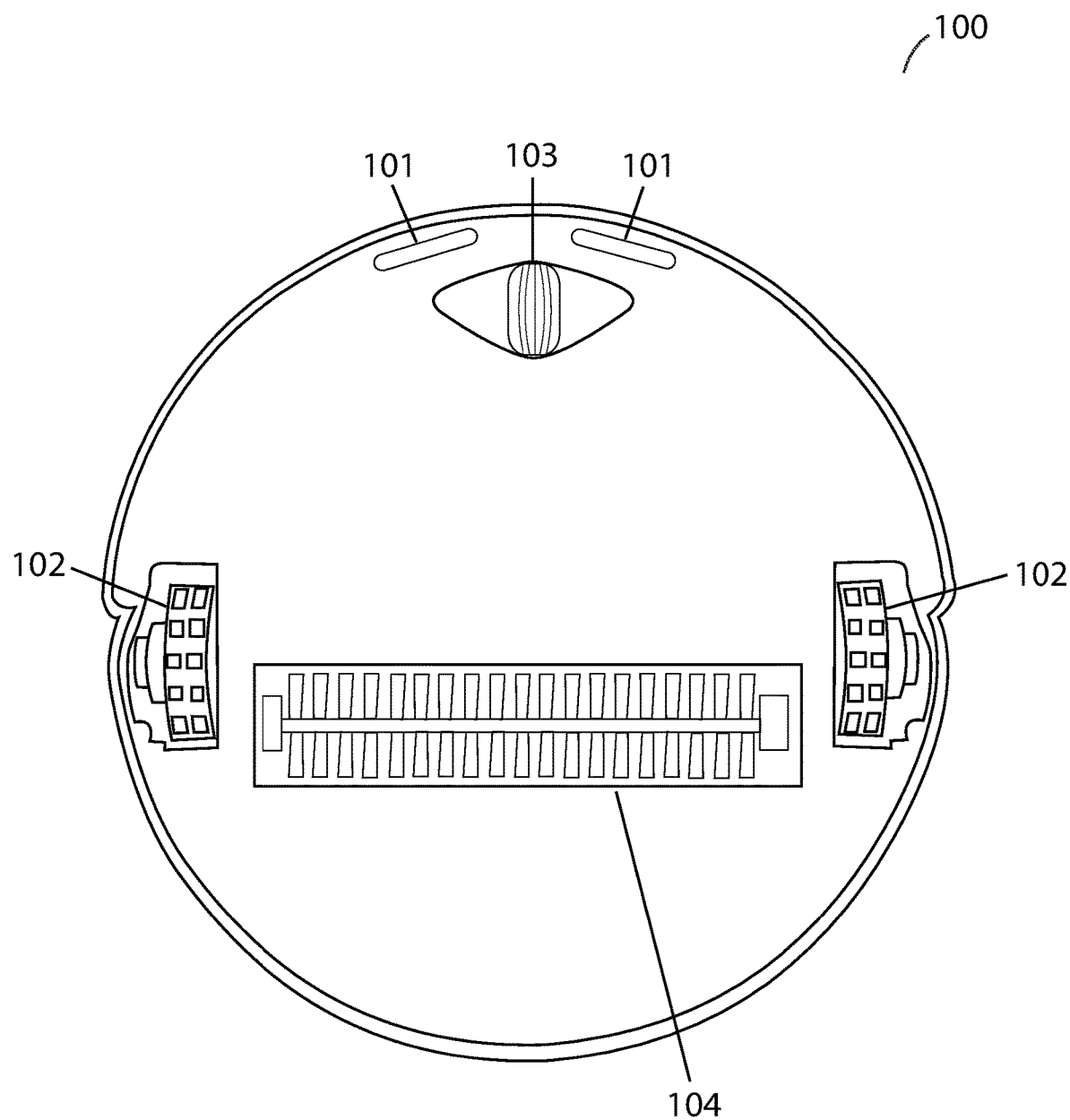
FIG. 1 illustrates an overhead view of an example of the underside of a robotic vacuum provided with rangefinder sensors to detect edges, according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Embodiments of the present invention introduce a method for identifying dangerous drop-offs or edges by mobile automated devices. The mobile automated device in this document is generally referred to as a robotic vacuum but edge identification methods disclosed herein are not limited to one type of mobile automated devices and may be utilized by any number of different types of automated devices that move autonomously through environments. For example, the proposed invention may also be used in robotic floor polishers, robotic lawn mowers, and unmanned ground vehicles. Thus, the usage or references to vacuuming is not intended to limit the scope of the invention, but rather serve as an illustrative example.

As understood herein, the terms "edge", "drop-off", "ledge", and "cliff" (by way of example) are used to refer to any vertical or very steep descent. For example, in homes, a cliff may include, but is not limited to, a descending step or staircase, the edge of a table that a robotic device has been placed on, or any other drop-off.

As understood herein, the term "robotic vacuum" may be defined generally to include one or more autonomous or semi-autonomous devices having communication, mobility, vacuuming and/or processing elements. For example, a robotic vacuum may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., one or more clock or synchronizing devices, a vacuum motor to provide suction, a debris dustbin to store debris, a brush to facilitate collection of debris, and a means to spin the brush. In some embodiments, the robotic devices described herein may also include user interfaces that enables communication between a user and the device. The user interface may be provided as an application on a mobile device that is wirelessly connected to the robotic device, for example, through WiFi or Bluetooth communication channels.

Generally, methods for mobile automated devices to identify dangerous edges using rangefinder sensors are proposed. In some embodiments, one or more rangefinder sensors may be positioned on the underside of a mobile automated device such that emitted signals are directed downward. In some embodiments, one or more rangefinders are positioned on other portions of the mobile automated device. For example, one or more rangefinders can be positioned on a side, front, and underside of the mobile automated device. In some embodiments, some of the rangefinders are positioned on a side of the mobile automated device and others are positioned on an underside. Any available type of rangefinder sensor may be employed, including laser rangefinder sensors, infrared rangefinder sensors, or ultrasonic rangefinder sensors. The one or more rangefinder sensors calculate the distance from their location to the nearest surface in their line of sight. On uniform flat surfaces, this distance, representing the distance from the bottom of the device to the work surface, is expected to remain substantially constant. Upon encountering a drop-off or cliff, the rangefinder sensors will detect a sudden increase in the distance to the nearest surface. A distance increase beyond a predetermined threshold may actuate the mobile automated device's methods for avoiding the area, which may include reversing, turning away, or other methods.

Generally, rangefinder sensors simultaneously emit a signal and start a timer. When the signal reaches an obstacle, it bounces off and, in a second step, reflects back into a receiver. Receipt of a reflected signal stops the timer. Because the signals travel at a constant rate, the time elapsed between when a signal is sent and when it is received may be used to calculate the distance that the signal traveled, and, thus, the distance from the sensor to the reflecting surface.

FIG. 1 illustrates an overhead view of the underside of an example of a robotic vacuum 100 with a set of rangefinder sensors 101 installed along a portion of the periphery thereof. A robotic vacuum may also include driving wheels 102, a front wheel 103 for steering, and a cleaning apparatus 104. The positioning of rangefinder sensors may vary, however, in the preferred embodiment, rangefinder sensors are positioned substantially around a portion of (or all of) the periphery of the underside of the particular device in question so that, as the device is traveling in a forward direction, the rangefinder sensors may detect an edge before either any wheels of the device have traversed the edge or the center of mass of the device has passed the edge.

Figure 2A:
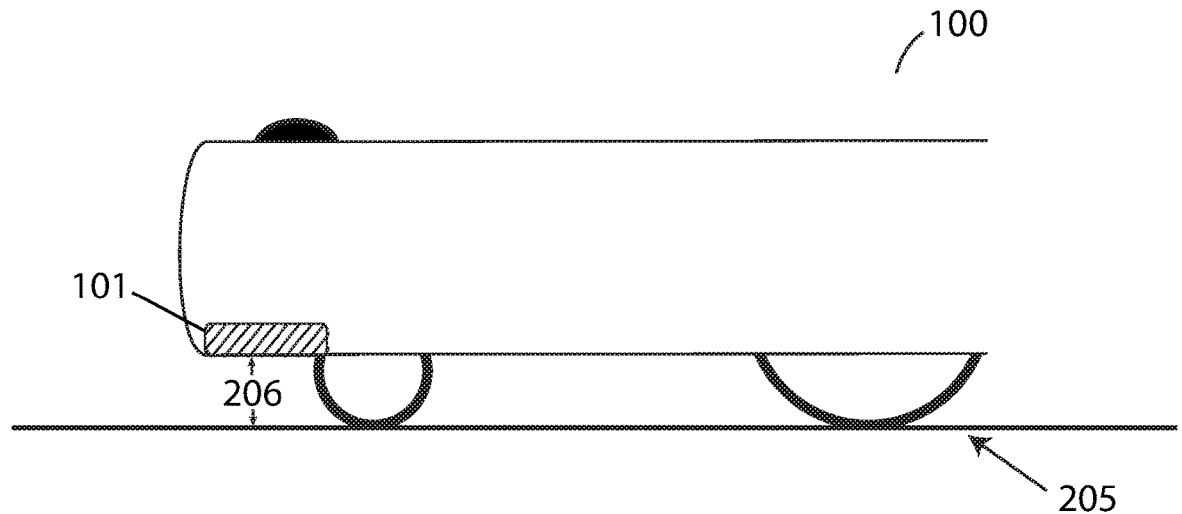
FIG. 2A illustrates an example of the operation of rangefinder sensors in detecting that there is no edge, according to some embodiments.

FIG. 2A illustrates a side elevation view of an example of a robotic vacuum 100 using rangefinder sensors 101 over a surface 205 with no edges. The rangefinder sensors 101 continuously calculate the distance 206 from their location to the nearest surface, which is typically the work surface 205. (The nearest surface could be an item positioned on top of the work surface that the device has driven over.) The rangefinder sensors are electrically coupled with a processor of the device (not shown), which monitors the calculated distances. Positive changes in the distance greater than a predetermined amount may trigger the device's methods and algorithms for avoiding an area. In the example shown in FIG. 2A, no positive change is detected (indicating that no edges have been identified) and the device continues operation as normal.

Figure 2B:
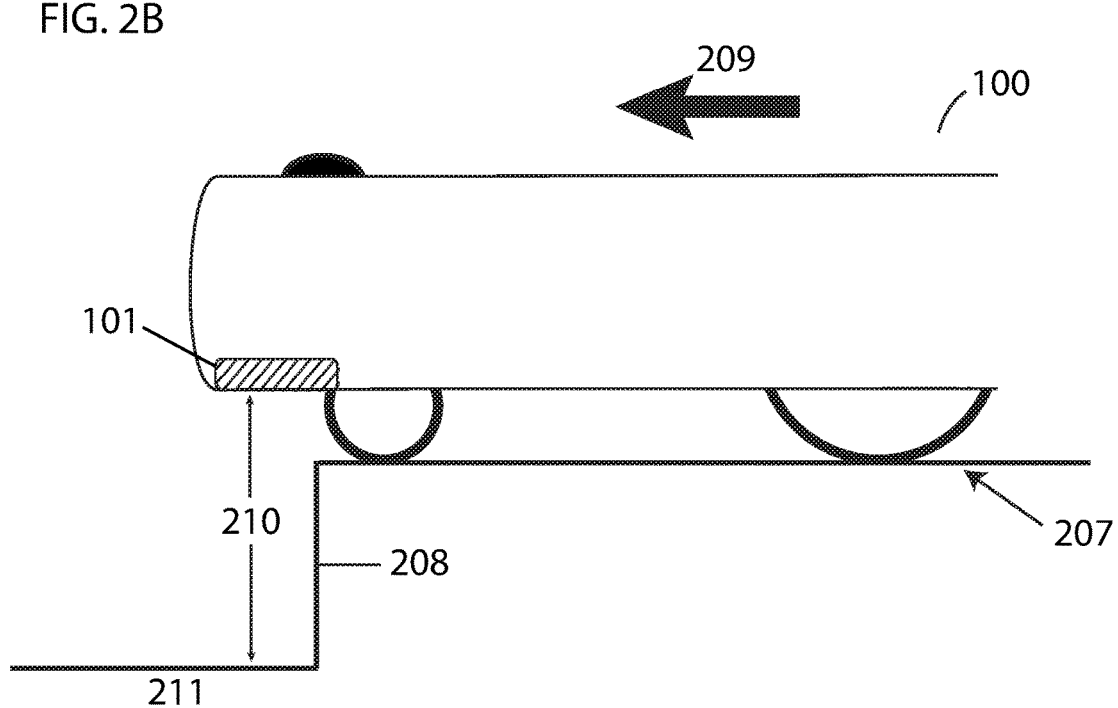
FIG. 2B illustrates an example of the operation of rangefinder sensors in detecting a dangerous edge, according to some embodiments.

FIG. 2B illustrates a side elevation view of an example of a robotic vacuum 100 using rangefinder sensors 101 over a surface 207 with an edge 208. In this case, the robotic vacuum has moved in a direction 209 to arrive at the current location where the distance 210 from the rangefinder sensor 101 to the nearest surface 211 is significantly greater than before. The increase in distance may be greater than a predetermined amount and trigger the device's methods for avoiding the area, thereby stopping the device from falling off the edge.

Figure 3:
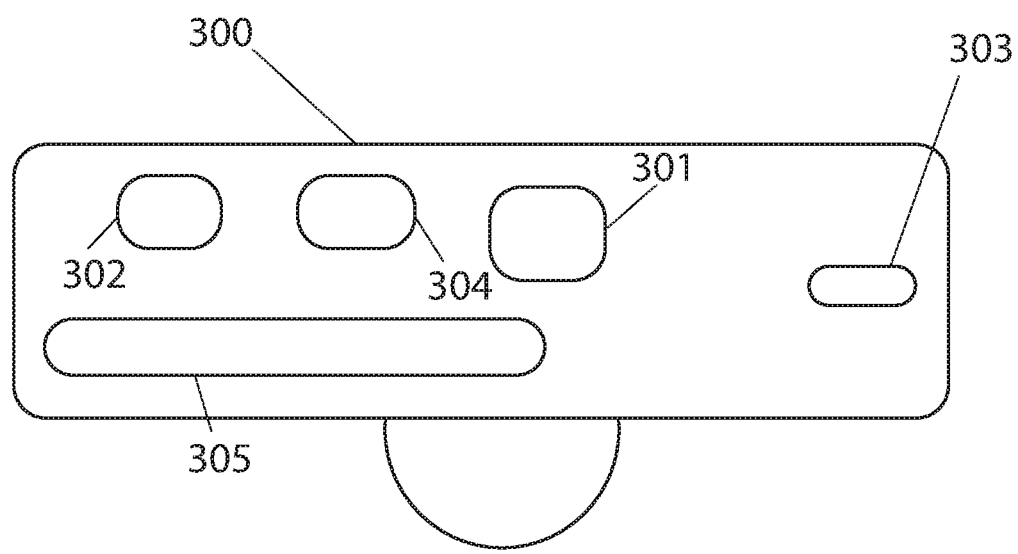
FIG. 3 illustrates a side view of an example of a robotic device, in this case a vacuum, according to some embodiments.

FIG. 3 illustrates a side view of an example of a robotic vacuum 300 with a processor 301, memory 302, rangefinder sensor 303, actuator 304, and battery 305. In some embodiments, the robotic vacuum 300 may include the features of a mobile automated device described herein. In some embodiments, program code stored in the memory 302 and executed by the processor 301 may effectuate the operations described herein.

Figure 4:
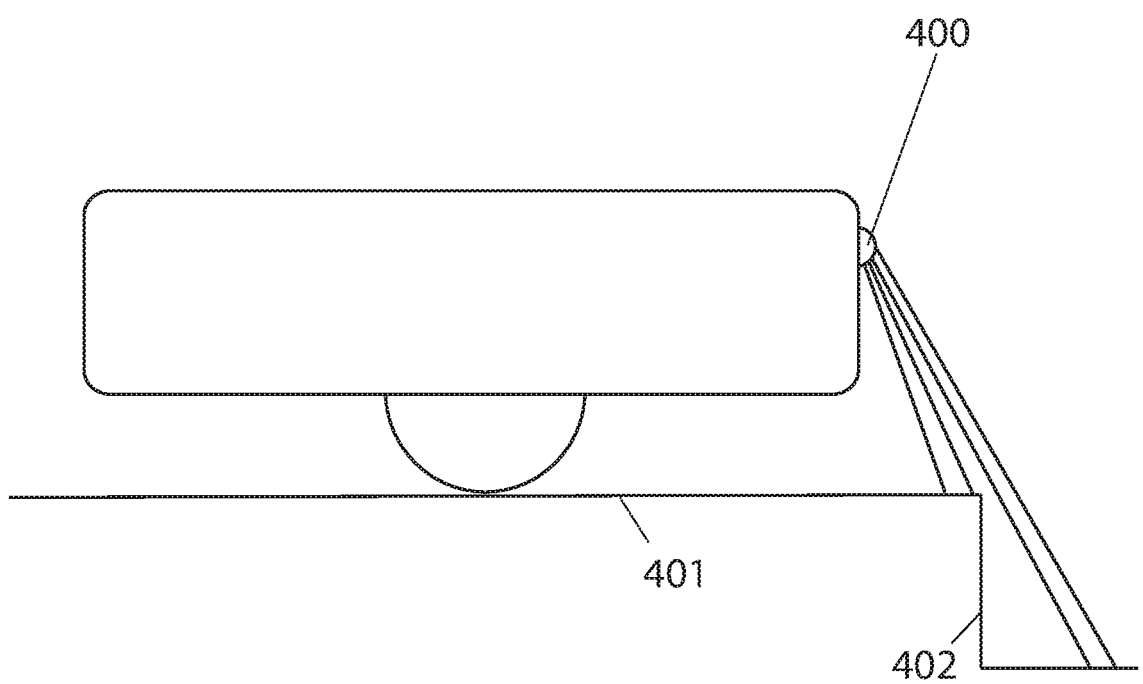
FIG. 4 illustrates a side view of an example of a robotic device, in this case a vacuum, with a rangefinder on a front side of the robotic vacuum, according to some embodiments.
Figure 5:
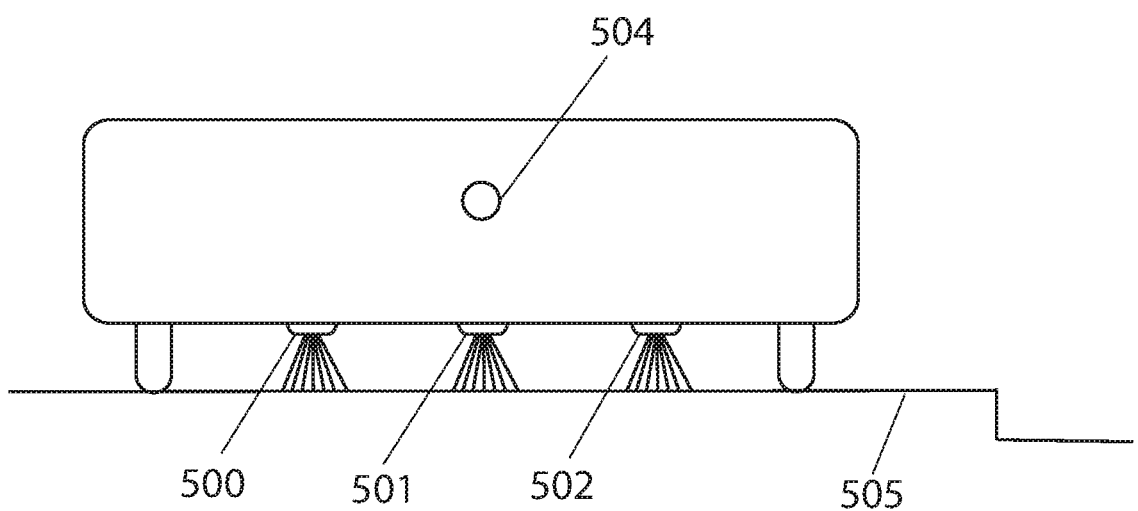
FIG. 5 illustrates a front view of an example of a robotic device, in this case a vacuum, with multiple rangefinders on a bottom side of the robotic vacuum, according to some embodiments.

In some embodiments, rangefinders are positioned on one or more portions of the mobile automated device. For example, FIG. 4 illustrates a side view of an example of a robotic vacuum with rangefinder 400 positioned on a front side of the robotic vacuum. Rangefinder 400 measures distances to surface 401 as the robotic device approaches cliff 402. A processor of the robotic vacuum detects cliff 402 by detecting an increase in distances measured by rangefinder 400. FIG. 5 illustrates a front view of an example of a robotic vacuum with rangefinders 500, 501, and 502 positioned on a bottom side and 504 on a front side of the robotic vacuum. Rangefinders 500, 501, 502, and 504 measure distances to surface 505.

Figure 6:
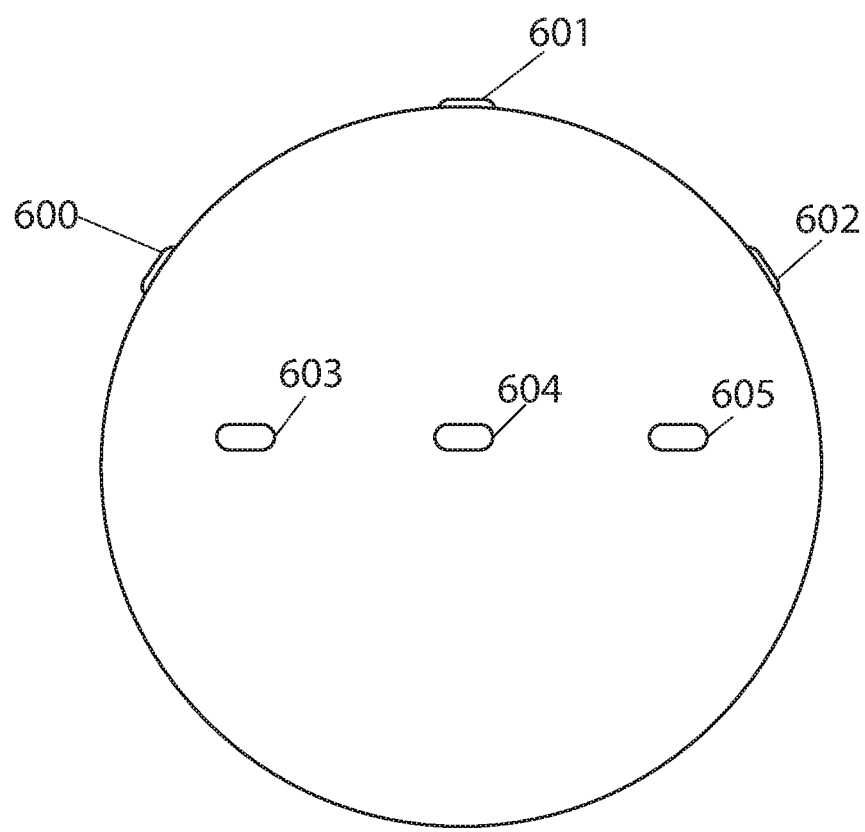
FIG. 6 illustrates a top view of an example of a robotic device, in this case a vacuum, with multiple rangefinders on a front and bottom side of the robotic vacuum, according to some embodiments.
Figure 7:
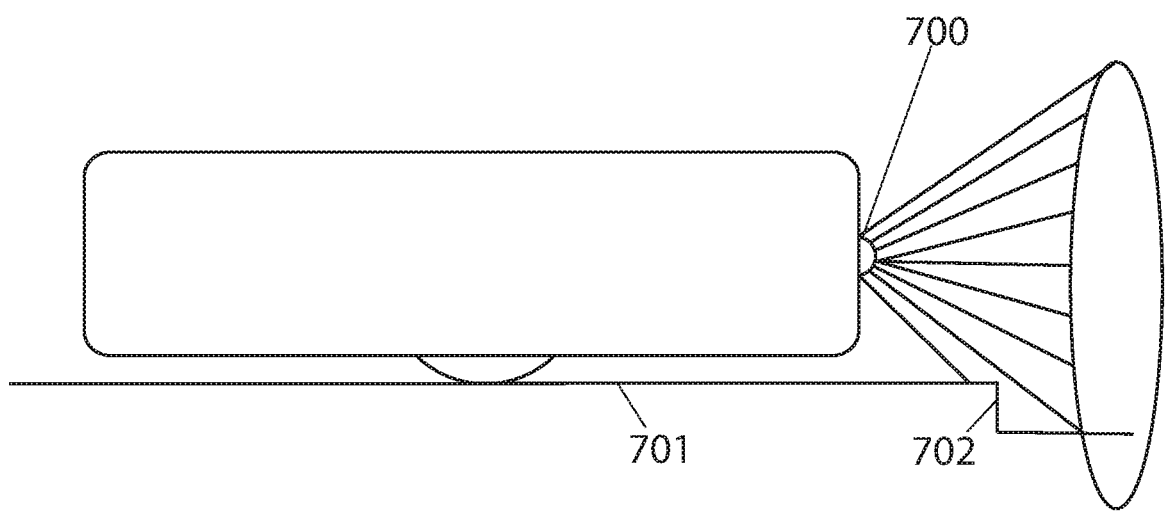
FIG. 7 illustrates a side view of an example of a robotic device, in this case a vacuum, with a LIDAR on a front side of the robotic vacuum, according to some embodiments.

FIG. 6 illustrates a top view of an example of a robotic vacuum with rangefinders 600, 601, 602, 603, 605, and 605 positioned on a front, side, and bottom of the robotic vacuum. FIG. 7 illustrates a side view of an example of a robotic vacuum with LIDAR 700 on a front side of the robotic vacuum. LIDAR 700 measures distances to surface 701 in three dimensions as the robotic device approaches cliff 702. In embodiments, different arrangements of rangefinders and LIDAR systems (or otherwise distance sensors or detection systems) are possible. In some embodiments, the distance sensors include distance sensors such as those described in U.S. patent application Ser. Nos. 15/243,783, 15/954,335, 15/954,410, 15/257,798, 15/674,310, 15/224,442, and 15/683,255, the entire contents of which are hereby incorporated by reference.

Methods for avoiding areas include methods or algorithms employed to drive a mobile device away from a particular area. These methods may include turning 180 degrees and driving in the opposite direction, reversing, turning a small amount and then continuing, etc.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method for a mobile automated device to detect and avoid edges comprising: providing one or more rangefinder sensors on the mobile automated device to calculate, continuously or periodically, distances from the one or more rangefinder sensor to a surface; monitoring, with a processor of the mobile automated device, the distances calculated by each of the one or more rangefinder sensors; and actuating, with the processor of the mobile automated device, the mobile automated device to execute one or more predetermined movement patterns upon the processor detecting a calculated distance greater than a predetermined amount, wherein the one or more movement patterns initiate movement of the mobile automated device away from the area where the increase was detected.

2. The method of embodiment 1, wherein the one or more rangefinder sensors are positioned on at least one of: a bottom, a side, a front, and a back of the mobile automated device.

3. The method of embodiments 1-2, wherein the one or more rangefinders are positioned on the bottom of the mobile automated device and oriented downwards.

4. The method of embodiments 1-3, wherein the one or more rangefinder sensors comprise any of: ultrasonic waves, laser beams, and infrared beams.

5. The method of embodiments 1-4, wherein the one or more rangefinder sensors are positioned along at least a portion of the periphery of the bottom of the mobile automated device.

6. The method of embodiments 1-5, wherein the one or more movement patterns comprise reversing, turning away from the area where the increase was detected, and driving forward.

7. A system for identifying edges for a mobile automated device comprising: one or more rangefinder sensors coupled to the mobile automated device capable of calculating, continuously or periodically, distances to a surface; and a processor electrically coupled with the one or more rangefinder sensors capable of monitoring the distances calculated by each of the one or more rangefinder sensors and capable of actuating the mobile automated device to execute one or more predetermined movement patterns upon detecting a calculated distance greater than a predetermined amount, wherein the one or more movement patterns initiate movement of the mobile automated device away from the area where the increase was detected.

8. The system of embodiment 7, wherein the one or more rangefinder sensors are positioned on at least one of: a bottom, a side, a front, and a back of the mobile automated device.

9. The system of embodiments 7-8, wherein the one or more rangefinders are positioned on the bottom of the mobile automated device and oriented downwards.

10. The system of embodiments 7-9, wherein the one or more rangefinder sensors comprise any of: ultrasonic waves, laser beams, and infrared beams.

11. The system of embodiments 7-10, wherein the one or more rangefinder sensors are positioned along at least a portion of the periphery of the bottom of the mobile automated device.

12. The system of embodiments 7-11, wherein the one or more movement patterns comprise reversing, turning away from the area where the increase in distance was detected, and driving forward.

13. A robotic device comprising: a chassis; a drive system installed in the chassis capable of enabling movement of the robotic device, the drive system comprising a set of wheels; a control system in communication with the drive system including a processor capable of controlling the drive system to execute at least one movement pattern of the robotic device; a battery to provide power to the system; and one or more distance sensors positioned on the chassis and electrically coupled with the processor to calculate distances from the one or more distance sensors to a surface, wherein the distances calculated by each of the one or more rangefinder sensors are monitored by the processor, and wherein a detected distance greater than a predetermined amount causes the control system to initiate execution of one or more predetermined movement patterns.

14. The robotic device of embodiment 13 further comprising: a cleaning assembly including a rotatable brush and an intake area; an impeller to provide suction to collect debris; and a debris holding container.

15. The robotic device of embodiments 13-14, wherein the one or more distance sensors are positioned on at least one of: a bottom, a side, a front, and a back of the robotic device.

16. The robotic device of embodiments 13-15, wherein the one or more distance sensors are positioned on the bottom of the robotic device and oriented downwards.

17. The robotic device of embodiments 13-16, wherein the one or more distance sensors comprise any of: ultrasonic waves, laser beams, and infrared beams.

18. The robotic device of embodiments 13-17, wherein the one or more distance sensors are positioned along at least a portion of the periphery of the bottom of the robotic device.

19. The robotic device of embodiments 13-18, wherein the one or more distance sensors are positioned along at least a portion of the periphery of the front, side, and bottom of the robotic device.

20. The robotic device of embodiments 13-19, wherein the one or more movement patterns comprise reversing, turning away from the area where the increase in distance was detected, and driving forward.

We claim:

1. A method for a mobile automated device to detect and avoid edges comprising:
    providing one or more rangefinder sensors on the mobile automated device to calculate, continuously or periodically, distances from the one or more rangefinder sensors to a surface;
    monitoring, with a processor of the mobile automated device, the distances calculated by each of the one or more rangefinder sensors; and
    actuating, with the processor of the mobile automated device, the mobile automated device to execute one or more predetermined movement patterns upon the processor detecting an edge when a calculated distance is greater than a predetermined amount, wherein the one or more movement patterns initiate movement of the mobile automated device away from the area where the edge was detected.

2. The method of claim 1, wherein the one or more rangefinder sensors are positioned on at least one of: a bottom, a side, a front, and a back of the mobile automated device.

3. The method of claim 1, wherein the one or more rangefinders are positioned on the bottom of the mobile automated device and oriented downwards.

4. The method of claim 1, wherein the one or more rangefinder sensors comprise any of: ultrasonic waves, laser beams, and infrared beams.

5. The method of claim 1, wherein the one or more rangefinder sensors are positioned along at least a portion of the periphery of the bottom of the mobile automated device.

6. The method of claim 1, wherein the one or more movement patterns comprise reversing, turning away from the area where the edge was detected, and driving forward.

7. A system for identifying edges for a mobile automated device comprising:
    one or more rangefinder sensors coupled to the mobile automated device capable of calculating, continuously or periodically, distances to a surface; and
    a processor electrically coupled with the one or more rangefinder sensors capable of monitoring the distances calculated by each of the one or more rangefinder sensors and capable of actuating the mobile automated device to execute one or more predetermined movement patterns upon detecting an edge when a calculated distance is greater than a predetermined amount, wherein the one or more movement patterns initiate movement of the mobile automated device away from the area where the edge was detected.

8. The system of claim 7, wherein the one or more rangefinder sensors are positioned on at least one of: a bottom, a side, a front, and a back of the mobile automated device.

9. The system of claim 7, wherein the one or more rangefinders are positioned on the bottom of the mobile automated device and oriented downwards.

10. The system of claim 7, wherein the one or more rangefinder sensors comprise any of: ultrasonic waves, laser beams, and infrared beams.

11. The system of claim 7, wherein the one or more rangefinder sensors are positioned along at least a portion of the periphery of the bottom of the mobile automated device.

12. The system of claim 7, wherein the one or more movement patterns comprise reversing, turning away from the area where the edge was detected, and driving forward.

13. The method of claim 1, wherein the mobile automated device comprises:
    a chassis;
    a set of wheels coupled to the chassis;
    a motor to drive the wheels;
    a processor;
    a memory;
    a battery; and
    a cleaning apparatus.

14. The method of claim 1, wherein an application of a communication device is wirelessly connected to the mobile automated device.

15. The method of claim 1, wherein at least one of the one or more rangefinders are positioned at a downwards angle such that distances are measured at some distance in front of the one or more rangefinders.

16. The method of claim 1, wherein:
the method further comprises providing one or more LIDAR sensors on the mobile automated device to calculate, continuously or periodically, distances from the one or more LIDAR sensors to a surface; or
the one or more rangefinders are replaced with one or more LIDAR sensors.

17. The system of claim 7, wherein the mobile automated device comprises:
a chassis;
a set of wheels coupled to the chassis;
a motor to drive the wheels;
a processor;
a memory;
a battery; and
a cleaning apparatus.

18. The system of claim 7, wherein an application of a communication device is wirelessly connected to the mobile automated device.

19. The system of claim 7, wherein the one or more rangefinders are positioned at a downwards angle such distances are measured at some distance in front of the one or more rangefinders.

20. The system of claim 7, wherein:
the system further comprises one or more LIDAR sensors coupled to the mobile automated device for calculating distances to surfaces; or
the one or more rangefinders are replaced with one or more LIDAR sensors.

\* \* \* \* \*